Patented Jan. 5, 1937

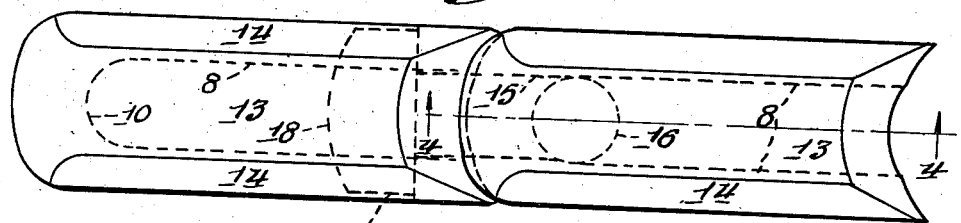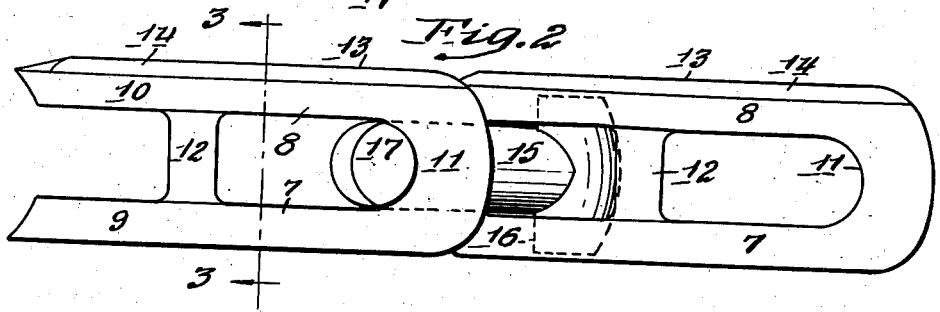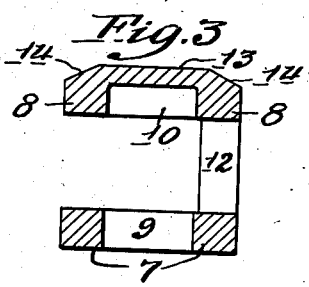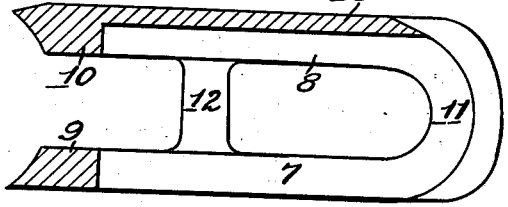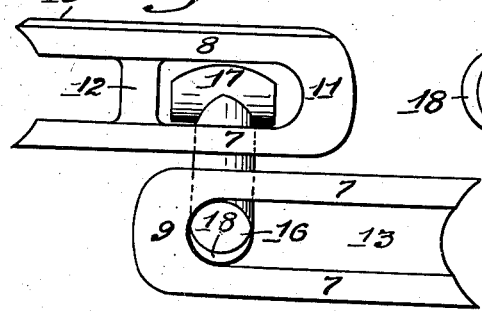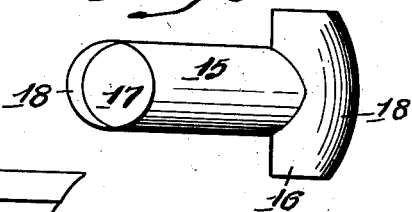

2,066,723

UNITED STATES PATENT OFFICE 2,066,723

CONVEYER CHAIN

Smith Eggleston and Dudley F. Holbert, St. Paul, Minn., assignors to Standard Conveyor Company, a corporation of Minnesota Application June 11, 1934, Serial No. 730,018

1 Claim. (Cl. 198—189)

This invention relates to a chain of the type particularly, although not exclusively, adapted for use as a conveyer where containers or other loads are directly supported on the chain and the path over which the loads are carried is such that flexing of the chain horizontally as well as vertically is required.

It is our object to provide an inexpensive, strong and durable chain of this type.

A further object is to provide a chain of this class adapted to be flexed abruptly in planes at right angles to each other and having links adapted to be connected together and separated merely by proper manipulation and without the use of small fastening devices, such as cotter keys, nuts and the like.

Other objects will appear and be more fully pointed out in the following specification and claim.

Referring to the drawing which illustrates the best form of our device at present known to us, Figure 1 is a plan view of a portion of the chain comprising a pair of links and the connection between them;

Fig. 2 is a side elevation of the same;

Fig. 3 is a transverse section through one of the links taken on the line 3—3 of Fig. 2;

Fig. 4 is a longitudinal section through a link taken on the line 4—4 of Fig. 1;

Fig. 5 illustrates the relative positions of a pair of links and the connection during the operation of separating or connecting a pair of the links, and Fig. 6 is a side view of one of the link connecting devices.

Each link has a pair of bottom bars 7 and a pair of top bars 8 all extending longitudinally of the chain, in parallel relation to each other. At one end of the link, the bars 7 are connected together by an arcuate bearing member 9 and at the same end of the chain the bars 8 are connected together by a similar arcuate bearing member 10. At the opposite end of the link there are arcuate bearing members 11 at each side of the link connecting the bar 7 with the bar 8. Rigidly connecting one of the bars 7 to the bar 8 on the same side of the chain is a bracing member 12 and the top of the chain is substantially closed by a web 13 integral with the bars 8 and having beveled side edges 14 for the purpose hereinafter described.

The device for joining adjacent links together, best shown in Fig. 6, has a shank 15 extending longitudinally of the chain. A head 16 is integral with the shank 15 at one end and projects at opposite sides to engage a pair of the arcuate bearing members formed on the links. At the opposite end of the shank 15 a head 17 is formed to extend perpendicularly to the head 16 but otherwise similar thereto. The heads 16 and 17 have semi-cylindrical inner peripheries to fit in semi-cylindrical surfaces of the bearing members. Outer end surfaces 18 are formed on the heads 16 and 17 to bear upon the teeth of sprocket wheels (not shown) for driving the chain. It will be understood that the teeth of such sprocket wheels project between the bars 7 to engage the surfaces 18 in driving the chain.

When a pair of the links are to be joined together either the head 16 or 17 may first be inserted between a pair of the bars 7 or between one of the bars 7 and a bar 8, while the head is held in parallel relation to the bars, and then the shank 15 is turned about its axis to seat the head either against the bearing members 9 and 10 or against the members 11. Assuming that the head 16 has been so seated in the members 9 and 10 of one link, with shank 15 perpendicular to the bars of the first link, the head 17 may be inserted between the members 7 of the second or upper link, as illustrated in Fig. 5 and then the link carrying the shank 15 may be turned about 90 degrees about the axis of said shank so that the head 17 is seated in the arcuate bearing members 11. Finally the links are merely moved to their normal positions in end to end relation to each other. It will be understood that the outer end surfaces of the bearing members 9, 10 and 11 are suitably formed to permit flexing of the chain about the axis of the head 16 in one plane and about the axis of the head 17 in a plane perpendicular to the first plane.

Our improved chain is commonly used in creameries and breweries where containers of various shapes and kinds and of considerable weight are supported directly on the chain while being transported along horizontal and inclined guideways which are curved horizontally and vertically. Such chains are subject to severe strains and damaging wear produced by contact with the objects conveyed and guides. By providing the closed top surface on the chain, greatly improved wearing qualities are secured and we eliminate the danger of portions of the articles being caught in the recesses of the chain. Containers and other objects are frequently delivered to the chain by sliding them laterally to rest on the top surface and heretofore difficulty has been experienced due to the striking of the articles against exposed vertical edges or corners of the chains. We eliminate such difficulties by providing the beveled side edges 14 on the webs 13. Furthermore, the webs 13 and reinforcing bars 12 make it possible to reduce the cost of the chain by the long link construction and at the same time afford ample strength and wearing qualities in a chain of the type adapted to make abrupt turns in planes perpendicular to each other.

Having described our invention, what we claim as new and desire to protect by Letters Patent is:

A conveyer chain comprising, a plurality of links each formed with U-shaped side members extending in parallel relation to each other and U-shaped top and bottom members extending parallel to each other at the opposite end of each link from said side members and formed integral therewith, each of said members being formed with an inner semi-cylindrical bearing surface, a narrow, vertical bar rigidly joining the longitudinal reaches of one of said side members of each link together in spaced relation to the ends thereof, a web substantially closing the top of each link, the side edges of said web sloping laterally outward and down to facilitate lateral movement of objects supported by the chain, and means connecting said links together comprising, a rigid member extending longitudinally of the chain and having cross heads projecting from its ends respectively to engage the side U-shaped members of one link and the top and bottom U-shaped members of the adjacent link, said cross heads having surfaces adapted to pivotally fit said semi-cylindrical surfaces of said U-shaped members and being arranged to constitute contact members for the teeth of sprocket wheels and the bottom and one side only of each link having openings for said teeth.

SMITH EGGLESTON.
DUDLEY F. HOLBERT.